(12) United States Patent
Kawai

(10) Patent No.: US 10,069,991 B2
(45) Date of Patent: Sep. 4, 2018

(54) DISPLAY DEVICE FOR CONTROLLING DISPLAY PANEL, IMAGE PROCESSING APPARATUS INCLUDING DISPLAY DEVICE, AND POWER FEEDING METHOD

(71) Applicant: KYOCERA Document Solutions Inc., Osaka-shi, Osaka (JP)

(72) Inventor: Hisaji Kawai, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 75 days.

(21) Appl. No.: 15/294,451

(22) Filed: Oct. 14, 2016

(65) Prior Publication Data

US 2017/0111536 A1    Apr. 20, 2017

(30) Foreign Application Priority Data

Oct. 16, 2015   (JP) ................................ 2015-204352

(51) Int. Cl.
*H04N 1/00*            (2006.01)
(52) U.S. Cl.
CPC ..... *H04N 1/00904* (2013.01); *H04N 1/00129* (2013.01); *H04N 2201/0089* (2013.01); *H04N 2201/0094* (2013.01)
(58) Field of Classification Search
CPC ........... H04N 1/00893; H04N 1/00904; H04N 1/00129
USPC ...................................... 358/1.14, 1.15, 1.16
See application file for complete search history.

(56) References Cited

U.S. PATENT DOCUMENTS 5,834,857 A * 11/1998 Abe ...................... H02J 7/0068
307/43
2008/0144070 A1   6/2008 Mori et al.

FOREIGN PATENT DOCUMENTS

| JP | H10275036 A | 10/1998 |
|----|----|----|
| JP | 2008149602 A | 7/2008 |
| JP | 2011203536 A | 10/2011 |
| JP | 2013061569 A | 4/2013 |

* cited by examiner

*Primary Examiner* — Eric A Rust
(74) *Attorney, Agent, or Firm* — Alleman Hall Creasman & Tuttle LLP

(57) ABSTRACT

This display device includes a display control portion, a first power supply, a second power supply, and a connection control portion. The display control portion is capable of controlling display of a display panel and is configured to execute a predetermined control finish process before display control for the display panel is finished. The first power supply is configured to supply power supplied from an external power supply, to the display control portion. The second power supply is capable of storing power and is configured to supply power to a clock portion. The connection control portion is configured to connect the display control portion with the first power supply if disconnection of connection between the external power supply and the first power supply is not detected, and connect the display control portion with the second power supply if disconnection of the connection is detected.

8 Claims, 5 Drawing Sheets

DISPLAY DEVICE FOR CONTROLLING DISPLAY PANEL, IMAGE PROCESSING APPARATUS INCLUDING DISPLAY DEVICE, AND POWER FEEDING METHOD

INCORPORATION BY REFERENCE

This application is based upon and claims the benefit of priority from the corresponding Japanese Patent Application No. 2015-204352 filed on Oct. 16, 2015, the entire contents of which are incorporated herein by reference.

BACKGROUND

The present disclosure relates to a display device for controlling a display panel, an image processing apparatus including a display device, and a power feeding method.

Some image processing apparatuses such as a printer include a display control portion for controlling a display panel which displays the operation status of the image processing apparatus. In this type of image processing apparatus, the display control portion operates by power supplied from a power supply connected to an external power supply. In the image processing apparatus, the display control portion may execute a predetermined control finish process before display control by the display control portion is finished. For example, in the control finish process, power feeding to a control circuit of the display control portion is stopped after power feeding to the display panel is stopped.

By the way, in the image processing apparatus, the connection between the external power supply and the power supply may be disconnected by user's operation on a main power supply switch, power outage, or the like. In this case, a malfunction can occur in which, for example, power feeding to the display control portion is stopped before the control finish process is finished, thereby causing abnormality on display of the display panel. In this regard, a configuration that enables continuation of power feeding to the control circuit of the display control portion by using a capacitor and the like when the connection between the external power supply and the power supply is disconnected, is known as the relevant art.

SUMMARY

A display device according to one aspect of the present disclosure includes a display panel, a display control portion, a first power supply, a clock portion, a second power supply, a disconnection detecting portion, and a connection control portion. The display control portion is capable of controlling display of the display panel and is configured to execute a predetermined control finish process before display control for the display panel is finished. The first power supply is configured to supply power supplied from an external power supply, to the display control portion. The clock portion is configured to measure time. The second power supply is capable of storing power and is configured to supply power to the clock portion. The disconnection detecting portion is configured to detect disconnection of connection between the external power supply and the first power supply. The connection control portion is configured to connect the display control portion with the first power supply if disconnection of the connection is not detected by the disconnection detecting portion, and connect the display control portion with the second power supply if disconnection of the connection is detected by the disconnection detecting portion.

An image processing apparatus according to another aspect of the present disclosure includes the display device and one or both of an image reading portion and an image forming portion. The image reading portion is capable of reading image data from a document. The image forming portion is capable of forming an image on the basis of image data.

A power feeding method according to another aspect of the present disclosure is executed by a processor provided in a display device including: a display panel; a display control portion capable of controlling display of the display panel and configured to execute a predetermined control finish process before display control for the display panel is finished; a first power supply configured to supply power supplied from an external power supply, to the display control portion; a clock portion configured to measure time; and a second power supply configured to supply power to the clock portion and capable of storing power. The power feeding method includes a first step and a second step. In the first step, disconnection of connection between the external power supply and the first power supply is detected. In the second step, the display control portion is connected with the first power supply if disconnection of the connection is not detected in the first step, and the display control portion is connected with the second power supply if disconnection of the connection is detected in the first step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, embodiments of the present disclosure will be described for understanding of the present disclosure. It is noted that the following embodiments are examples in which the present disclosure is embodied, and do not limit the technical scope of the present disclosure.

[Schematic Configuration of Image Processing Apparatus 10]

First, with reference to FIG. 1 and FIG. 2, the schematic configuration of an image processing apparatus 10 according to an embodiment of the present disclosure will be described. Here, FIG. 1 is a schematic sectional view showing the configuration of the image processing apparatus 10.

Figure 1:
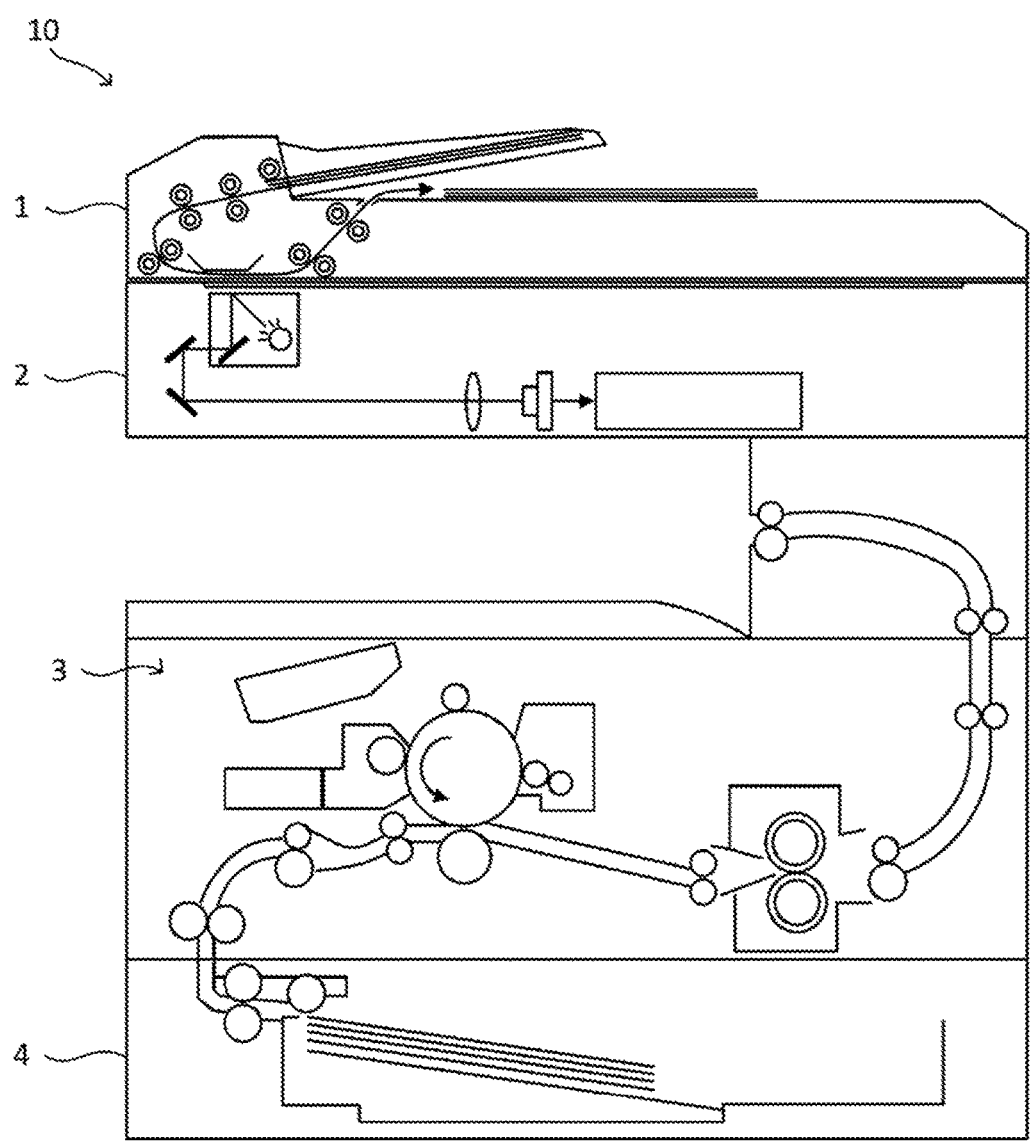
FIG. 1 is a diagram showing the configuration of an image processing apparatus according to an embodiment of the present disclosure.
Figure 2:
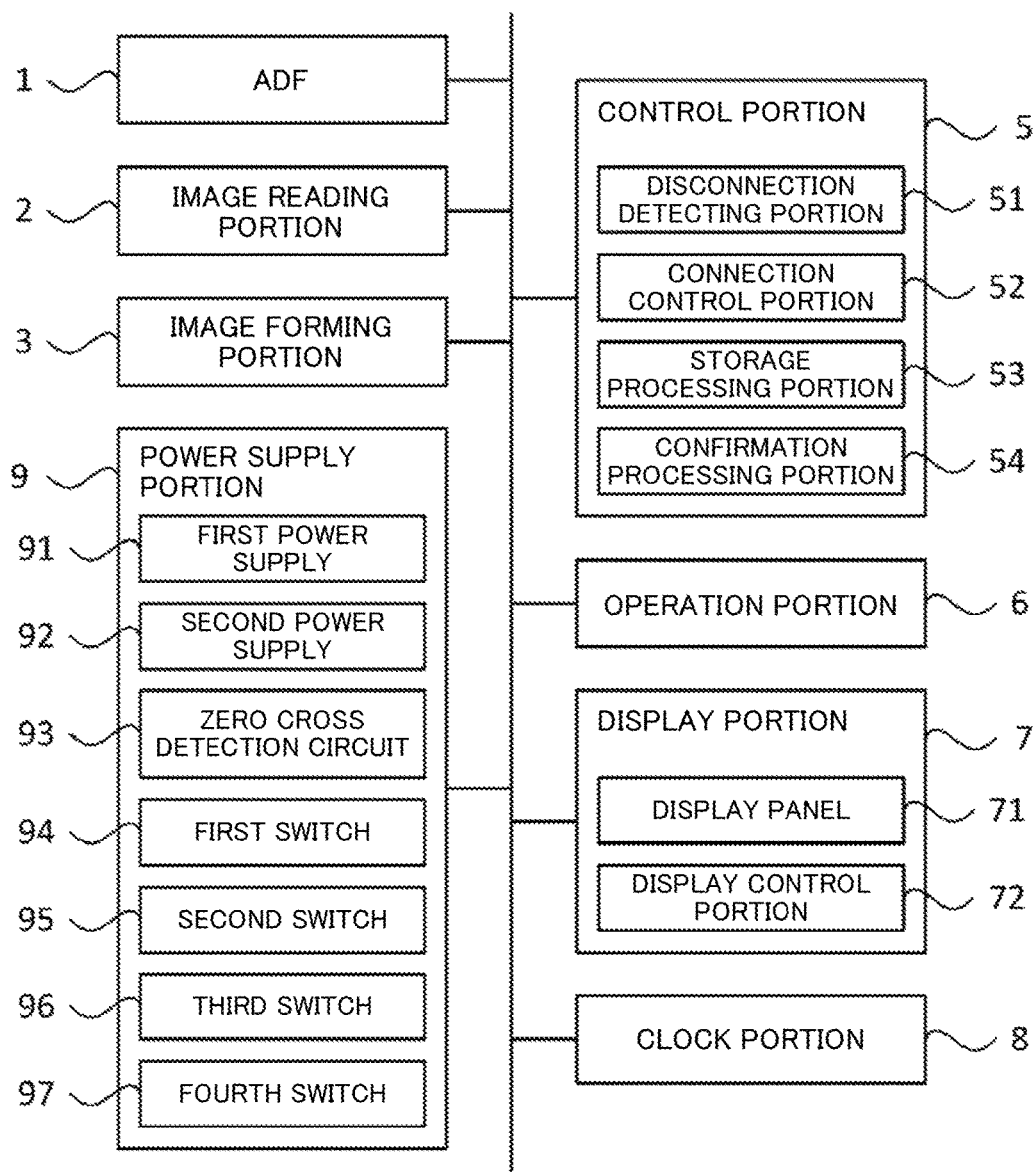
FIG. 2 is a block diagram showing the system configuration of the image processing apparatus according to the embodiment of the present disclosure.

As shown in FIG. 1 and FIG. 2, the image processing apparatus 10 includes an ADF 1, an image reading portion 2, an image forming portion 3, a sheet feed portion 4, a control portion 5, an operation portion 6, a display portion 7, a clock portion 8, and a power supply portion 9. The image processing apparatus 10 is a multifunction peripheral having a plurality of functions such as a facsimile function or a copy function as well as a scan function of reading image data from a document and a print function of forming an image on the basis of image data. Here, a device including the control portion 5, the display portion 7, the clock portion 8, and the power supply portion 9 is an example of a display device in the present disclosure. In addition, the present disclosure is applicable to image processing apparatuses such as a scanner device, a printer device, a facsimile device, and a copy machine.

The ADF 1 includes a document set portion, a plurality of conveyance rollers, a document holder, and a sheet discharge portion, and is an automatic document feeder which conveys a document to be read by the image reading portion 2. The image reading portion 2 includes a document table, a light source, a plurality of mirrors, an optical lens, and a CCD (Charge Coupled Device), and is capable of reading image data from a document.

The image forming portion 3 is capable of forming an image in an electrophotographic manner on the basis of image data read by the image reading portion 2 or image data inputted from an information processing device such as an external personal computer. Specifically, the image forming portion 3 includes a photosensitive drum, a charging device, a light scanning unit (LSU), a developing device, a transfer roller, a cleaning device, a fixing roller, a pressure roller, and a sheet discharge tray. In the image forming portion 3, an image is formed on a sheet fed from the sheet feed portion 4, and then the sheet on which the image has been formed is discharged to the sheet discharge tray.

The control portion 5 includes control devices such as a CPU, a ROM, a RAM, and an EEPROM, which are not shown. The CPU is a processor which executes various calculation processes. The ROM is a nonvolatile storage portion in which information such as a control program for causing the CPU to execute various processes is stored in advance. The RAM is a volatile storage portion used as a temporary storage memory (working area) for various processes to be executed by the CPU. The EEPROM is a nonvolatile storage portion. In the control portion 5, various control programs stored in advance in the ROM are executed by the CPU. Thus, the image processing apparatus 10 is comprehensively controlled by the control portion 5. It is noted that the control portion 5 may be configured from an electronic circuit such as an integrated circuit (ASIC), or may be a control portion provided separately from a main control portion for comprehensively controlling the image processing apparatus 10.

The operation portion 6 is an operation key or a touch panel for inputting various information to the control portion 5 in accordance with a user's operation.

The display portion 7 displays various information such as the operation status of the image processing apparatus 10 in accordance with a control command from the control portion 5. Specifically, as shown in FIG. 2, the display portion 7 includes a display panel 71 and a display control portion 72. For example, the display panel 71 is a liquid crystal panel.

The display control portion 72 is capable of controlling display of the display panel 71. For example, the display control portion 72 includes: a control circuit which operates with voltage of 3.3V fed from a first power supply 91 of the power supply portion 9 described later; and a step-up circuit which steps up voltage of 3.3V fed from the first power supply 91, to drive voltage of 24V, and supplies the drive voltage to the display panel 71. The control circuit controls the drive voltage applied from the step-up circuit to the display panel 71, on the basis of screen data inputted from the control portion 5.

The display control portion 72 executes a predetermined control finish process before the display control for the display panel 71 is finished. For example, in the control finish process, power feeding to the step-up circuit and the control circuit are stopped in order of the step-up circuit and then the control circuit.

The clock portion 8 is a real-time clock for measuring time. The clock portion 8 inputs time information indicating the current time being measured, to the control portion 5, in response to request from the control portion 5. The time information inputted from the clock portion 8 to the control portion 5 is used for, for example, recording of a transmission/reception time of a facsimile. The clock portion 8 operates with power supplied from the first power supply 91 or a second power supply 92 of the power supply portion 9 described later.

By the way, in the image processing apparatus 10, the connection between an external power supply 20 (see FIG. 3) and the first power supply 91 may be disconnected by user's operation on a main power supply switch, power outage, or the like. In this case, a malfunction can occur in which, for example, power feeding to the display control portion 72 is stopped before the control finish process is finished, thereby causing abnormality on display of the display panel 71. In this regard, a configuration that enables continuation of power feeding to the control circuit of the display control portion 72 by using a capacitor and the like when the connection between the external power supply 20 and the first power supply 91 is disconnected, is known as the relevant art.

However, in the relevant art, it is necessary to add new components such as a capacitor capable of feeding power to the control circuit of the display control portion 72 even when power feeding from the external power supply 20 is interrupted. On the other hand, the image processing apparatus 10 according to the embodiment of the present disclosure enables continuation of power feeding to the display control portion 72 when the connection between the external power supply 20 and the first power supply 91 is disconnected, by using the existing configuration, as described below.

Figure 3:
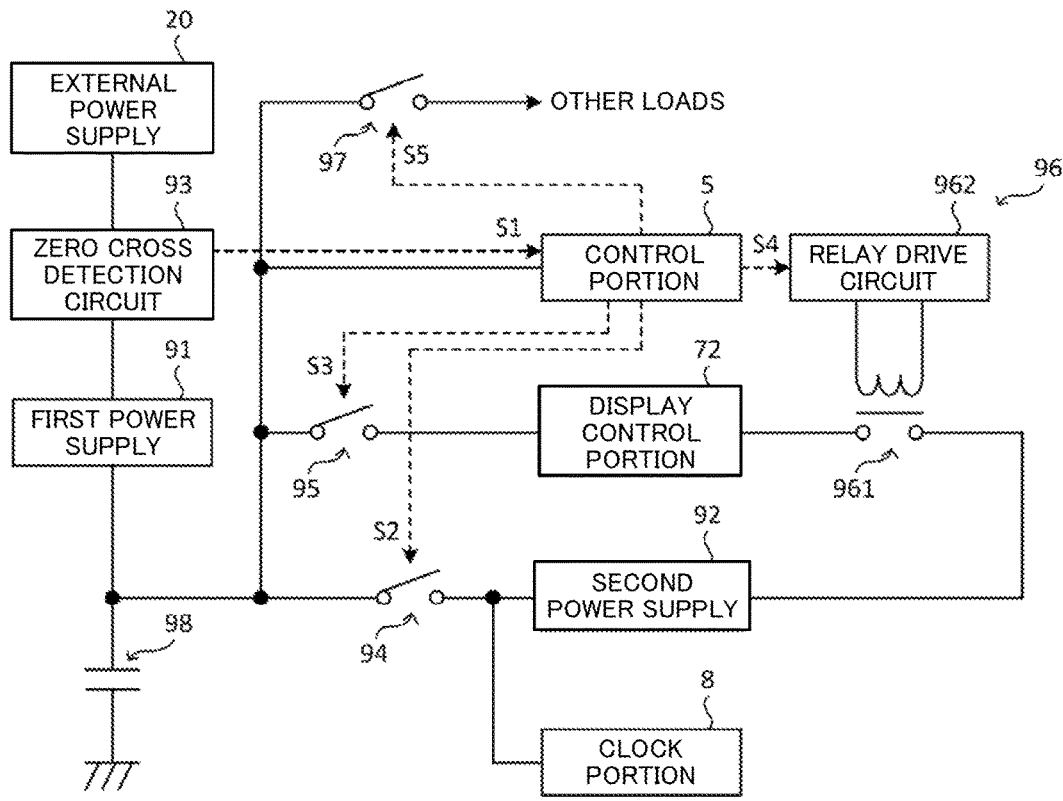
FIG. 3 is a diagram showing the configuration of a power supply portion of the image processing apparatus according to the embodiment of the present disclosure.

Hereinafter, with reference to FIG. 2 and FIG. 3, the power supply portion 9 will be described. FIG. 3 is a block diagram showing the configuration of the power supply portion 9.

As shown in FIG. 2 and FIG. 3, the power supply portion 9 includes the first power supply 91, the second power supply 92, a zero cross detection circuit 93, a first switch 94, a second switch 95, a third switch 96, a fourth switch 97, and a smoothing capacitor 98.

The first power supply 91 supplies power supplied from the external power supply 20, to each part of the image processing apparatus 10. For example, the first power supply 91 is an AC-DC converter which converts AC voltage of 100V supplied from the external power supply 20, to DC voltage of 3.3V. As shown in FIG. 3, the first power supply 91 supplies power supplied from the external power supply 20, to the control portion 5, the display control portion 72, the second power supply 92, and the clock portion 8. In addition, the first power supply 91 supplies power supplied from the external power supply 20, to other loads such as the image reading portion 2.

The second power supply 92 is capable of storing power, and supplies power to the clock portion 8. For example, the second power supply 92 is a storage battery (secondary battery) to be charged with power supplied from the first power supply 91. As shown in FIG. 3, while the second power supply 92 is being connected to the first power supply 91 by the first switch 94, the second power supply 92 is charged with power supplied from the first power supply 91. When the second power supply 92 is disconnected from the first power supply 91 by the first switch 94, the second power supply 92 supplies power to the clock portion 8. In addition, when the second power supply 92 is disconnected from the first power supply 91 by the first switch 94 and is connected to the display control portion 72 by the third switch 96, the second power supply 92 supplies power to the clock portion 8 and the display control portion 72.

The zero cross detection circuit 93 is an electric circuit capable of detecting a zero cross point of AC voltage supplied from the external power supply 20. When having detected the zero cross point, the zero cross detection circuit 93 inputs a detection signal S1 indicating the detection of the zero cross point, to the control portion 5. For example, the control portion 5 performs current conduction control for a heater provided in the fixing roller of the image forming portion 3, on the basis of the detection signal S1 inputted from the zero cross detection circuit 93.

As shown in FIG. 3, the first switch 94 is provided on a current conduction path connecting the first power supply 91 with the second power supply 92 and the clock portion 8, and can switch the current conduction path between a conductive state and a nonconductive state. For example, the first switch 94 is a transistor switch which makes the current conduction path conductive in accordance with a control signal S2 inputted from the control portion 5. Specifically, when the control signal S2 is being inputted from the control portion 5, the first switch 94 connects the first power supply 91 with the second power supply 92 and the clock portion 8, and when input of the control signal S2 is stopped, the first switch 94 disconnects the connection between the first power supply 91, and the second power supply 92 and the clock portion 8. It is noted that the first switch 94 may be a relay circuit or the like.

As shown in FIG. 3, the second switch 95 is provided on a current conduction path connecting the first power supply 91 and the display control portion 72, and can switch the current conduction path between a conductive state and a nonconductive state. For example, as in the first switch 94, the second switch 95 is a transistor switch which makes the current conduction path conductive in accordance with a control signal S3 inputted from the control portion 5. Specifically, when the control signal S3 is being inputted from the control portion 5, the second switch 95 connects the first power supply 91 and the display control portion 72, and when input of the control signal S3 is stopped, the second switch 95 disconnects the connection between the first power supply 91 and the display control portion 72.

As shown in FIG. 3, the third switch 96 is provided on a current conduction path connecting the second power supply 92 and the display control portion 72, and can switch the current conduction path between a conductive state and a nonconductive state. For example, the third switch 96 includes a relay circuit 961 and a relay drive circuit 962 which disconnects the relay circuit 961 in accordance with a control signal S4 inputted from the control portion 5. Specifically, when the control signal S4 is being inputted from the control portion 5, the third switch 96 disconnects the connection between the second power supply 92 and the display control portion 72, and when input of the control signal S4 is stopped, the third switch 96 connects the second power supply 92 and the display control portion 72. Here, the third switch 96 is an example of a changeover switch in the present disclosure. It is noted that the third switch 96 may be an electric circuit configured using a transistor.

As shown in FIG. 3, the fourth switch 97 is provided on a current conduction path connecting the first power supply 91 and the other loads, and can switch the current conduction path between a conductive state and a nonconductive state. For example, the fourth switch 97 is a transistor switch which makes the current conduction path conductive in accordance with a control signal S5 inputted from the control portion 5. Specifically, when the control signal S5 is being inputted from the control portion 5, the fourth switch 97 connects the first power supply 91 and the other loads, and when input of the control signal S5 is stopped, the fourth switch 97 disconnects the connection between the first power supply 91 and the other loads.

As shown in FIG. 3, the smoothing capacitor 98 is provided on a current conduction path connecting the first power supply 91 and the ground, and absorbs and smooths variation in DC voltage outputted from the first power supply 91. In addition, when the connection between the external power supply 20 and the first power supply 91 is disconnected, the smoothing capacitor 98 supplies charged power to the control portion 5.

In the ROM of the control portion 5, a connection control program for causing the CPU to execute a connection control process (see flowchart in FIG. 5) and a time confirmation process (see flowchart in FIG. 6) described later is stored in advance. It is noted that the connection control program may be stored in a non-transitory computer-readable storage medium such as a CD, a DVD, or a flash memory, and may be read from the storage medium, to be installed onto the storage portion such as the EEPROM in the control portion 5.

As shown in FIG. 2, the control portion 5 includes a disconnection detecting portion 51, a connection control portion 52, a storage processing portion 53, and a confirmation processing portion 54. Specifically, the control portion 5 executes the connection control program stored in the ROM, using the CPU. Thus, the control portion 5 functions as the disconnection detecting portion 51, the connection control portion 52, the storage processing portion 53, and the confirmation processing portion 54.

The disconnection detecting portion 51 detects disconnection of the connection between the external power supply 20 and the first power supply 91. Specifically, the disconnection detecting portion 51 detects disconnection of the connection between the external power supply 20 and the first power supply 91 on the basis of the input interval of the detection signal S1 from the zero cross detection circuit 93. For example, the disconnection detecting portion 51 determines that the connection between the external power supply 20 and the first power supply 91 is disconnected, if the next detection signal S1 has not been inputted until a half period of AC voltage of the external power supply 20 elapses since the last detection signal S1 was inputted.

If disconnection of the connection between the external power supply 20 and the first power supply 91 is not detected by the disconnection detecting portion 51, the connection control portion 52 connects the display control portion 72 with the first power supply 91. If disconnection of the connection between the external power supply 20 and the first power supply 91 is detected by the disconnection detecting portion 51, the connection control portion 52 connects the display control portion 72 with the second power supply 92.

Specifically, if disconnection of the connection between the external power supply 20 and the first power supply 91 is not detected by the disconnection detecting portion 51, the connection control portion 52 inputs the control signal S3 to the second switch 95 to connect the display control portion 72 with the first power supply 91, and inputs the control signal S4 to the third switch 96 to disconnect the connection between the display control portion 72 and the second power supply 92.

On the other hand, if disconnection of the connection between the external power supply 20 and the first power supply 91 is detected by the disconnection detecting portion 51, the connection control portion 52 stops input of the control signal S4 to the third switch 96 to connect the display control portion 72 with the second power supply 92, and stops input of the control signal S3 to the second switch 95 to disconnect the connection between the display control portion 72 and the first power supply 91.

In addition, if disconnection of the connection between the external power supply 20 and the first power supply 91 is not detected by the disconnection detecting portion 51, the connection control portion 52 inputs the control signal S2 to the first switch 94 to connect the second power supply 92 and the clock portion 8 with the first power supply 91. In addition, if disconnection of the connection between the external power supply 20 and the first power supply 91 is detected by the disconnection detecting portion 51, the connection control portion 52 stops input of the control signal S2 to the first switch 94 to disconnect the connection between the first power supply 91, and the second power supply 92 and the clock portion 8.

In addition, if disconnection of the connection between the external power supply 20 and the first power supply 91 is not detected by the disconnection detecting portion 51, the connection control portion 52 inputs the control signal S5 to the fourth switch 97 to connect the other loads to the first power supply 91. In addition, if disconnection of the connection between the external power supply 20 and the first power supply 91 is detected by the disconnection detecting portion 51, the connection control portion 52 stops input of the control signal S5 to the fourth switch 97 to disconnect the connection between the other loads and the first power supply 91.

The storage processing portion 53 is capable of, if disconnection of the connection between the external power supply 20 and the first power supply 91 is detected by the disconnection detecting portion 51, executing a detection information storing process for storing detection information indicating this fact, in a storage portion. For example, the storage portion is the EEPROM of the control portion 5.

It is noted that the storage portion may be a nonvolatile storage portion such as a flash memory provided in the image processing apparatus 10.

For example, the storage processing portion 53 executes the detection information storing process only if disconnection of the connection between the external power supply 20 and the first power supply 91 is detected by the disconnection detecting portion 51 during execution of display control for the display panel 71 by the display control portion 72. For example, if disconnection of the connection between the external power supply 20 and the first power supply 91 is detected by the disconnection detecting portion 51, the storage processing portion 53 queries the display control portion 72 about the operation status, and determines whether or not the display control is being executed, on the basis of a response from the display control portion 72 with respect to the query.

If the detection information is stored in the storage portion when the image processing apparatus 10 is powered on, the confirmation processing portion 54 causes the display control portion 72 to display information to prompt performance of at least one of setting and confirmation of the time measured by the clock portion 8. For example, the confirmation processing portion 54 causes the display control portion 72 to display the display information until either setting operation or confirmation operation for the time measured by the clock portion 8 is received. For example, the display information includes the current time being measured by the clock portion 8.

Figure 4:
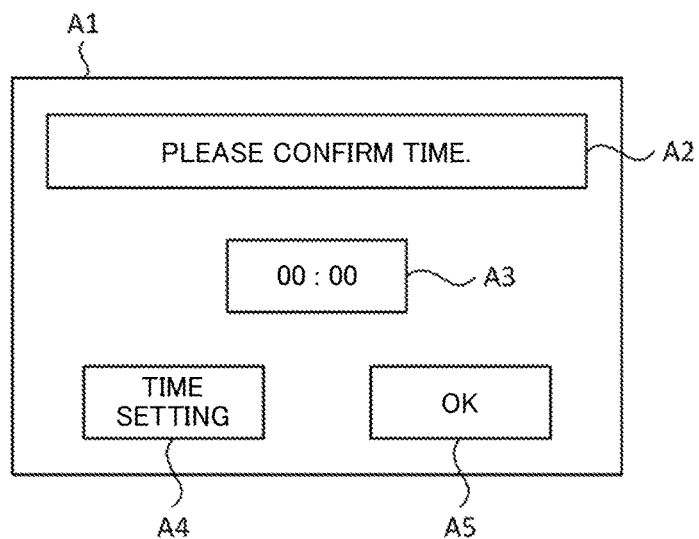
FIG. 4 is a diagram showing an example of display information displayed on a display panel of the image processing apparatus according to the embodiment of the present disclosure.

Here, FIG. 4 shows an examples of a display screen including the display information displayed on the display panel 71 by the confirmation processing portion 54. As shown in FIG. 4, a display screen A1 includes a message display field A2, a time display field A3, and operation keys A4 and A5.

In the time display field A3, the current time being measured by the clock portion 8 is displayed. In the message display field A2, a message to prompt confirmation of the time displayed in the time display field A3 is displayed. Here, the information displayed in the message display field A2 and the time display field A3 is an example of display information in the present disclosure.

When a user operates the operation key A4, the confirmation processing portion 54 causes the display control portion 72 to display a time input screen used for inputting the current time, to receive time input operation by the user. When the user performs the input operation on the time input screen, the confirmation processing portion 54 commands the clock portion 8 to set the time inputted through the input operation, as the current time. Here, the operation on the operation key A4 and the input operation on the time input screen are an example of setting operation in the present disclosure.

When the user operates the operation key A5, the confirmation processing portion 54 ends display of the display screen A1 by the display control portion 72. Here, the operation on the operation key A5 is an example of confirmation operation in the present disclosure.

[Connection Control Process]

Figure 5:
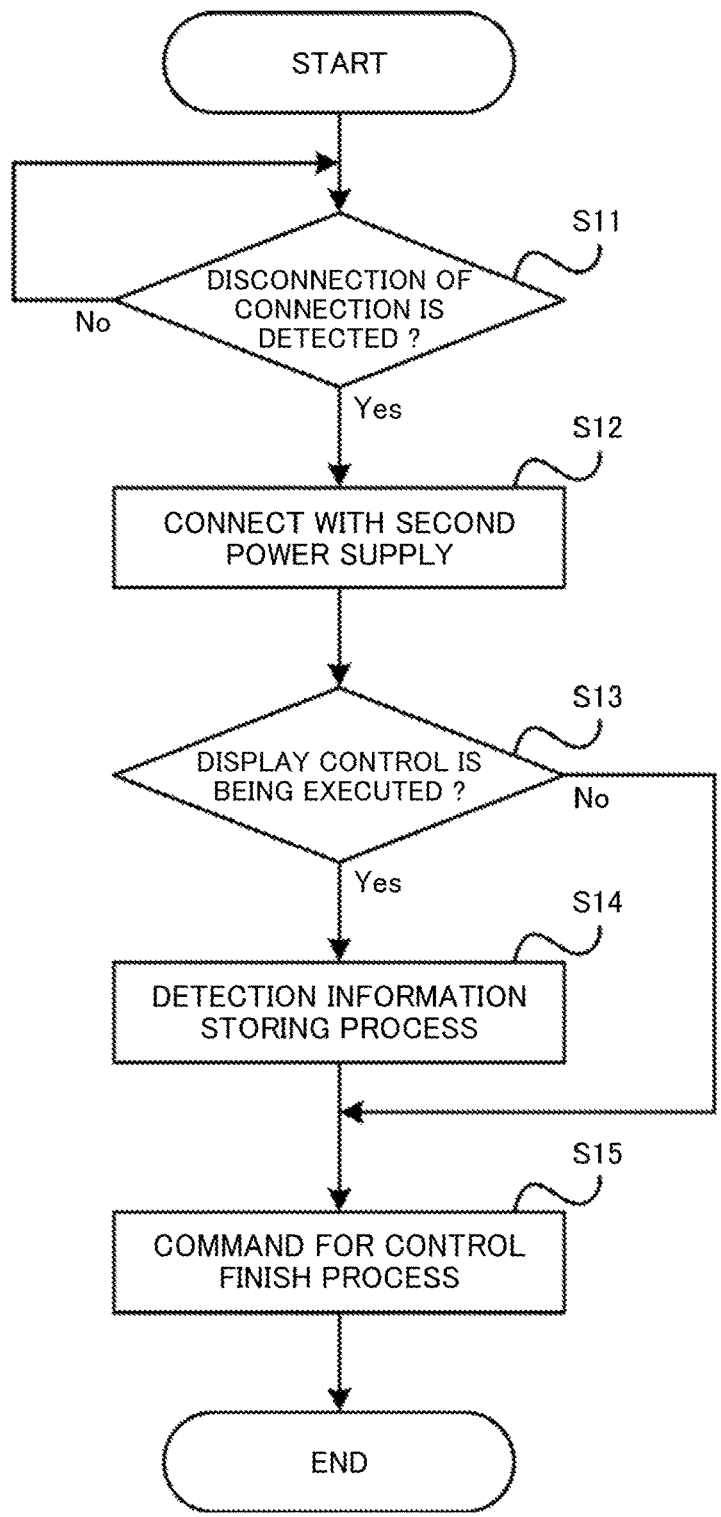
FIG. 5 is a flowchart showing an example of a connection control process executed by the image processing apparatus according to the embodiment of the present disclosure.

Next, with reference to FIG. 5, an example of the procedure of the connection control process executed by the control portion 5 in the image processing apparatus 10 will be described. Here, steps S11, S12, . . . denote the numbers of steps in the processing procedure executed by the control portion 5.

<Step S11>

First, in step S11, the control portion 5 determines whether or not disconnection of the connection between the external power supply 20 and the first power supply 91 is detected. Here, the processing of step S11 is an example of a first step in the present disclosure, and is executed by the disconnection detecting portion 51 of the control portion 5.

For example, if the next detection signal S1 has not been inputted until a half period of AC voltage of the external power supply 20 elapses since the last detection signal S1 was inputted from the zero cross detection circuit 93, the control portion 5 determines that the connection between the external power supply 20 and the first power supply 91 is disconnected.

Here, if the control portion 5 determines that disconnection of the connection between the external power supply 20 and the first power supply 91 is detected (Yes in S11), the control portion 5 shifts the process to step S12. On the other hand, if disconnection of the connection between the external power supply 20 and the first power supply 91 is not detected (No in S11), the control portion 5 waits for detection of disconnection of the connection between the external power supply 20 and the first power supply 91 in step S11.

Until disconnection of the connection between the external power supply 20 and the first power supply 91 is detected in step S11, the control portion 5 inputs the control signal S3 to the second switch 95 to connect the display control portion 72 with the first power supply 91, and inputs the control signal S4 to the third switch 96 to disconnect the connection between the display control portion 72 and the second power supply 92. Thus, the display control portion 72 operates with power supplied from the first power supply 91, until the connection between the external power supply 20 and the first power supply 91 is disconnected.

In addition, until disconnection of the connection between the external power supply 20 and the first power supply 91 is detected in step S11, the control portion 5 inputs the control signal S2 to the first switch 94 to connect the second power supply 92 and the clock portion 8 with the first power supply 91. Thus, the second power supply 92 is charged with power supplied from the first power supply 91, until the connection between the external power supply 20 and the first power supply 91 is disconnected. In addition, the clock portion 8 operates with power supplied from the first power supply 91, until the connection between the external power supply 20 and the first power supply 91 is disconnected.

In addition, until disconnection of the connection between the external power supply 20 and the first power supply 91 is detected in step S11, the control portion 5 inputs the control signal S5 to the fourth switch 97 to connect the other loads with the first power supply 91. Thus, power is supplied to the other loads from the first power supply 91 until the connection between the external power supply 20 and the first power supply 91 is disconnected.

<Step S12>

In step S12, the control portion 5 connects the display control portion 72 with the second power supply 92. Here, the processing of step S12 is an example of a second step in the present disclosure, and is executed by the connection control portion 52 of the control portion 5.

Specifically, the control portion 5 stops input of the control signal S4 to the third switch 96 to connect the display control portion 72 with the second power supply 92, and stops input of the control signal S3 to the second switch 95 to disconnect the connection between the display control portion 72 and the first power supply 91. Thus, when the connection between the external power supply 20 and the first power supply 91 is disconnected, the display control portion 72 can continue its operation with power supplied from the second power supply 92.

In addition, the control portion 5 stops input of the control signal S2 to the first switch 94 to disconnect the connection between the first power supply 91, and the second power supply 92 and the clock portion 8. Thus, the state of the second power supply 92 is switched from a charge state to a discharge state, and the power supply to supply power to the clock portion 8 is switched from the first power supply 91 to the second power supply 92.

In addition, the control portion 5 stops input of the control signal S5 to the fourth switch 97 to disconnect the connection between the other loads and the first power supply 91. Thus, the destination to which power is supplied from the smoothing capacitor 98 is limited to the control portion 5. Even after the connection between the external power supply 20 and the first power supply 91 is disconnected, the control portion 5 can continue the connection control process with the power that has been charged in the smoothing capacitor 98 until the connection is disconnected.

<Step S13>

In step S13, the control portion 5 determines whether or not the display control for the display panel 71 is being executed by the display control portion 72. For example, the control portion 5 queries the display control portion 72 about the operation status, and determines whether or not the display control is being executed, on the basis of a response from the display control portion 72 with respect to the query.

Here, if the control portion 5 determines that the display control is being executed (Yes in S13), the control portion 5 shifts the process to step S14. On the other hand, if the display control is not being executed (No in S13), the control portion 5 shifts the process to step S15.

<Step S14>

In step S14, the control portion 5 executes the detection information storing process to store the detection information in the storage portion. Here, the processing of step S13 and step S14 is executed by the storage processing portion 53 of the control portion 5.

<Step S15>

In step S15, the control portion 5 commands the display control portion 72 to execute the control finish process. In response to the command from the control portion 5, the display control portion 72 executes the control finish process. Here, in the image processing apparatus 10, power is supplied from the second power supply 92 to the display control portion 72 during execution of the control finish process by the display control portion 72. Thus, supply of power to the display control portion 72 is prevented from being stopped during execution of the control finish process.

[Time Confirmation Process]

Figure 6:
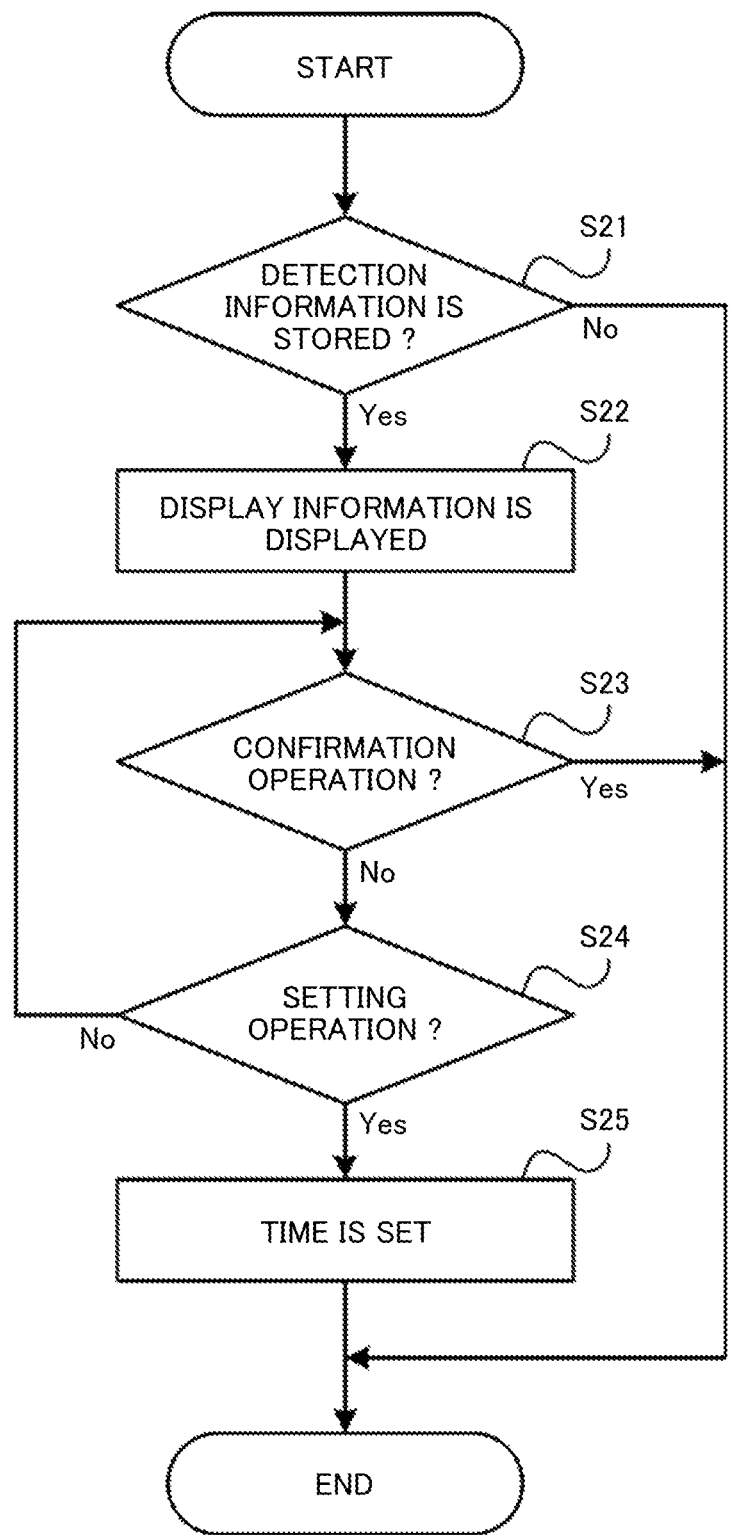
FIG. 6 is a flowchart showing an example of a time confirmation process executed by the image processing apparatus according to the embodiment of the present disclosure.

Next, with reference to FIG. 6, an example of the procedure of the time confirmation process executed by the control portion 5 in the image processing apparatus 10 will be described. Here, the time confirmation process is executed when a main power supply is turned on in the image processing apparatus 10.

<Step S21>

In step S21, the control portion 5 determines whether or not the detection information is stored in the storage portion.

Here, if the control portion 5 determines that the detection information is stored in the storage portion (Yes in S21), the control portion 5 shifts the process to step S22. On the other hand, if the detection information is not stored in the storage portion (No in S21), the control portion 5 ends the time confirmation process.

<Step S22>

In step S22, the control portion 5 causes the display control portion 72 to display the display information. For example, the control portion 5 causes the display control portion 72 to display the display screen A1 including the display information. Thus, the display screen A1 is displayed on the display panel 71.

<Step S23>

In step S23, the control portion 5 determines whether or not the confirmation operation for the time measured by the clock portion 8 is performed. For example, if the operation key A5 is operated on the display screen A1 displayed in step S22, the control portion 5 determines that the confirmation operation is performed.

Here, if the control portion 5 determines that the confirmation operation is performed (Yes in S23), the control portion 5 ends the time confirmation process. On the other hand, if the confirmation operation is not performed (No in S23), the control portion 5 shifts the process to step S24.

<Step S24>

In step S24, the control portion 5 determines whether or not the setting operation for the time measured by the clock portion 8 is performed. For example, if the operation key A4 is operated on the display screen A1 displayed in step S22, the control portion 5 causes the display control portion 72 to display the time input screen used for inputting the current time. Then, if the time input operation is performed on the time input screen, the control portion 5 determines that the setting operation is performed.

Here, if the control portion 5 determines that the setting operation is performed (Yes in S24), the control portion 5 shifts the process to step S25. On the other hand, if the setting operation is not performed (No in S24), the control portion 5 shifts the process to step S23 to wait for the confirmation operation or the setting operation by a user.

<Step S25>

In step S25, the control portion 5 sets the time measured by the clock portion 8, in accordance with the setting operation performed in step S24. For example, the control portion 5 commands the clock portion 8 to set the current time to the time inputted through the input operation on the time input screen. Here, the processing of steps S21 to S25 is executed by the confirmation processing portion 54 of the control portion 5.

As described above, in the time confirmation process, if the second power supply 92 is connected with the display control portion 72 in the connection control process, the display information is displayed on the display panel 71, to prompt confirmation as to whether or not the time measured by the clock portion 8 coincides with the current time. Thus, by the second power supply 92 being connected with the display control portion 72, even if power supplied to the clock portion 8 becomes insufficient and the time measured by the clock portion 8 is deviated, it is possible to give a user an opportunity for time setting operation at a timing immediately after the main power supply of the image processing apparatus 10 is turned on.

In addition, in the time confirmation process, considering that, in the case where the control finish process is executed by the display control portion 72 when the display control is not being executed, power consumption due to the control finish process by the display control portion 72 is smaller than in the case where the control finish process is executed during execution of the display control, the display information is displayed only if it is determined that the display control is being executed by the display control portion 72 in step S13 in the connection control process. This prevents an opportunity for time setting operation from being given to a user also in the case where there is no possibility that the time measured by the clock portion 8 is deviated.

As described above, in the image processing apparatus 10, if disconnection of the connection between the external power supply 20 and the first power supply 91 is detected, the display control portion 72 is connected with the second power supply 92 which supplies power to the clock portion 8. Thus, using the existing configuration, power feeding to the display control portion 72 can be continued when the connection between the external power supply 20 and the first power supply 91 is disconnected.

It is to be understood that the embodiments herein are illustrative and not restrictive, x since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display device comprising:
a display panel;
a display control portion capable of controlling display of the display panel and configured to execute a predetermined control finish process before display control for the display panel is finished;
a first power supply configured to supply power supplied from an external power supply, to the display control portion;
a clock configured to measure time;
a second power supply configured to supply power to the clock and capable of storing power;
a processor; and
a nonvolatile memory, wherein
the processor, by calculation processes, functions as:
  a disconnection detecting portion configured to detect disconnection of connection between the external power supply and the first power supply;
  a connection control portion configured to connect the display control portion with the first power supply if disconnection of the connection is not detected by the disconnection detecting portion, and connect the display control portion with the second power supply if disconnection of the connection is detected by the disconnection detecting portion;
  a storage processing portion capable of, if disconnection of the connection is detected by the disconnection detecting portion, executing a detection information storing process for storing detection information indicating that disconnection of the connection is detected, in the memory; and
  a confirmation processing portion configured to, if the detection information is stored in the memory when the display device is powered on, cause the display control portion to display display information to prompt performance of at least one of setting and confirmation of the time measured by the clock,
the display control portion includes a control circuit which operates with a voltage fed from the first power supply, and
in the control finish process, power feeding to the control circuit is stopped after power feeding to the display panel is stopped.

2. The display device according to claim 1, wherein
the storage processing portion executes the detection information storing process only if disconnection of the connection is detected by the disconnection detecting portion during execution of the display control by the display control portion.

3. The display device according to claim 1, wherein the display information includes a current time measured by the clock.

4. The display device according to claim 1, wherein the confirmation processing portion causes the display control portion to display the display information until either setting operation or confirmation operation for the time is received.

5. The display device according to claim 1, wherein the second power supply is a storage battery configured to be charged with power supplied from the first power supply.

6. The display device according to claim 1, further comprising
a changeover switch configured to disconnect connection between the display control portion and the second power supply when a control signal is being inputted, and connect the display control portion and the second power supply when input of the control signal is stopped, wherein
the connection control portion inputs the control signal to the changeover switch if disconnection of the connection is not detected by the disconnection detecting portion, and stops input of the control signal to the changeover switch if disconnection of the connection is detected by the disconnection detecting portion.

7. An image processing apparatus comprising:
the display device according to claim 1; and
one or both of a scanner capable of reading image data from a document and a printer capable of forming an image on the basis of image data.

8. A power feeding method to be executed by a processor provided in a display device including: a display panel; a display control portion capable of controlling display of the display panel and configured to execute a predetermined control finish process before display control for the display panel is finished; a first power supply configured to supply power supplied from an external power supply, to the display control portion; a clock configured to measure time; a second power supply configured to supply power to the clock and capable of storing power; and a nonvolatile memory, the power feeding method comprising:
a first step of detecting disconnection of connection between the external power supply and the first power supply;
a second step of connecting the display control portion with the first power supply if disconnection of the connection is not detected in the first step, and connecting the display control portion with the second power supply if disconnection of the connection is detected in the first step;
a third step of, if disconnection of the connection is detected in the first step, executing a detection information storing process for storing detection information indicating that disconnection of the connection is detected, in the memory; and
a fourth step of, if the detection information is stored in the memory when the display device is powered on, causing the display control portion to display display information to prompt performance of at least one of setting and confirmation of the time measured by the clock, wherein
the display control portion includes a control circuit which operates with a voltage fed from the first power supply, and
in the control finish process, power feeding to the control circuit is stopped after power feeding to the display panel is stopped.

* * * * *